(12) United States Patent
Chilamkurthi et al.

(10) Patent No.: US 11,748,554 B2
(45) Date of Patent: Sep. 5, 2023

(54) AMENDMENT TRACKING IN AN ONLINE DOCUMENT SYSTEM

(71) Applicant: DocuSign, Inc., San Francisco, CA (US)

(72) Inventors: Surendra Kumar Chilamkurthi, Naperville, IL (US); Heidi Robin Lyons, Madison, WI (US); Anirudha Vedavyasa Murthy Bharadwaj, Chicago, IL (US); Shivi Singh Verma, Issaquah, WA (US); Aaron Eugene Preston Jackson Wilde, Portland, OR (US); Cynthia Rosser, San Francisco, CA (US)

(73) Assignee: DOCUSIGN, INC., San Francisco, CA (US)

( * ) Notice: Subject to any disclaimer, the term of this patent is extended or adjusted under 35 U.S.C. 154(b) by 0 days.

(21) Appl. No.: 17/390,748

(22) Filed: Jul. 30, 2021

(65) Prior Publication Data
US 2023/0033563 A1   Feb. 2, 2023

(51) Int. Cl.
*G06F 17/00* (2019.01)
*G06F 40/169* (2020.01)
*G06F 40/295* (2020.01)
*G06N 20/00* (2019.01)
*G06V 30/14* (2022.01)

(52) U.S. Cl.
CPC ......... *G06F 40/169* (2020.01); *G06F 40/295* (2020.01); *G06N 20/00* (2019.01); *G06V 30/1444* (2022.01)

(58) Field of Classification Search
None
See application file for complete search history.

(56) References Cited

U.S. PATENT DOCUMENTS

| | | | |
|---|---|---|---|
| 2017/0270113 A1* | 9/2017 | Ebeling | G06F 40/106 |
| 2019/0272902 A1* | 9/2019 | Vozila | G06F 3/0482 |

* cited by examiner

*Primary Examiner* — Mustafa A Amin
(74) *Attorney, Agent, or Firm* — KDW FIRM PLLC

(57) ABSTRACT

An online document system can allow users to track various amendments made over time and corresponding to an original document. The online document system accesses the original document comprising a plurality of content sections and a set of amendment documents each comprising one or more amendments to the original document. The online document system applies a machine-learned model to the original document and the set of amendment documents to identify, for each amendment, a content section of the plurality that corresponds to the amendment and a type of amendment corresponding to the amendment. The online document system generates an amended original document comprising the plurality of content sections modified to include each amendment. The online document system displays the amended original document by displaying each of the plurality of content sections and, in conjunction with each content section, any amendments corresponding to the content section are highlighted.

16 Claims, 7 Drawing Sheets

400

```
Access an original document comprising a plurality of content
sections
410
            ↓
Access a set of amendment documents each comprising one or
more amendments to the original document
420
            ↓
Apply a machine-learned model to the original document and the
set of amendment documents to identify, for each amendment
document of the set of amendment documents, a content section
of the plurality of content sections corresponding to each
amendment of the one or more amendments and a type of
amendment corresponding to each amendment of the one or
more amendments
430
            ↓
Generate an amended original document comprising the plurality
of content sections modified to include each amendment
corresponding to each content section identified by the machine-
learned model
440
            ↓
Display the amended original document
450
```

FIG. 4

AMENDMENT TRACKING IN AN ONLINE DOCUMENT SYSTEM

BACKGROUND

This disclosure relates generally to tracking amendments of a document in a document family, and, more specifically, to identifying amendments and generating an amended document for presentation to users of an online document family management system.

An agreement memorializes the relational rights and obligations of entities as expressed in various content sections of a document (e.g., a sales contract, a purchase agreement, a leasing agreement, etc.) between two or more entities (such as companies, individuals, groups, or the like). The relationship between such entities can evolve over time and correspondingly updates to the document with respect to the terms, language, or other contents of the document would also be generated to reflect updated rights and obligations of the entities. The original document together with its applicable amendments may be considered a document family. In the course of an evolving relationship between entities, an original document can undergo various additions, deletions, substitutions, or other types of edits to one or more content sections to reflect new or different rights and obligations of the respective entities. Existing systems for managing the document family and tracking changes to the rights and obligations of the entities often involve an entity performing an optical character recognition (OCR)-based process on an original document and any amendment documents to-date that contain edits to various content sections of the original document. Generally, these systems make use of existing document editing or other management software resulting in a "redline" to track changes in a document. In an effort to analyze the lineage of rights and obligations of parties memorialized in a document family, this traditional approach requires a user to be familiar with the conceptual contents or sections of the document beyond OCR-based changes to determine the relational change with respect to a new term, language, or other content throughout a document family. For example in determining the changes in an entity's obligation as provided for in an original document and an applicable amendment, a traditional redline only shows the words, paragraphs, or other portions in an amendment document that differ in character or formatting form from the original document (e.g., additional spaces, replaced words, additional indentation, etc.), but the redline does not indicate whether and how such change affects the relationship-based concepts embodied in the original document (e.g., changes to an activity term, payment owed by an entity, period of time in which an entity may perform an activity, etc).

The manual process used by many existing systems (i.e., having individual entities rely on redlines which must be further reviewed by a user) can leave open multiple avenues for errors that can interrupt the process of analyzing and tracking a right or obligation of an entity as expressed in a document. For example, an entity can analyze the wrong documents (for example, analyzing a set of amendments in a document family in the wrong sequence), an entity can become confused with the conceptual meaning associated with a redline, or confusion can arise with the system and overall document family (for example, by being unable to easily track obligations stemming from an original document through the various amendments in the subject document family). Likewise, other similar problems can occur which can cause unnecessary confusion in the analysis and management of a document family.

SUMMARY

An online document family management system can allow entities (also referred to as users) to track various amendments (e.g., a set of time-based sequential amendments) corresponding to an original document. The original document can include a plurality of content sections with each content section including content (e.g., terms, language, images, etc.). The plurality of content sections and corresponding content may be modified as formalized by two or more entities. For example, two entities may go back and forth during a negotiation several times before the plurality of content sections and corresponding content are agreed upon and formalized in an amendment. As more and more amendment documents are created by the entities, keeping track of the amendments and the implication of the amendments to the relationship between the entities becomes burdensome for the entities. An online document family management system (also referred to as a 'online document system') described herein can access the original document and the set of amendment documents and track the various amendments made throughout the evolution of the document family. Additionally, by tracking the amendments and presenting the tracked amendments to the entities in an understandable way (e.g., by placing the amendments within the original document in a chronological order and highlighting them), a negotiation process based on an understanding of the document family can become more efficient and less prone to error.

In an implementation, the online document system applies a machine-learned model to the original document and the set of amendment documents to intelligently identify, for each amendment document, a content section of the original document corresponding to each amendment and a type of amendment corresponding to each amendment. The online document system generates an amended original document including the plurality of content sections modified to include each amendment corresponding to each content section identified by the machine-learned model based on the type of amendment identified by the machine-learned model. The online document system displays the amended original document within a document interface. The online document system displays each of the content sections of the amended original document and, in conjunction with each content section, any amendments corresponding to the content section are highlighted within the document interface, enabling a user to visualize the changes made over time to the content section and better understand how each change affects the rights, obligations, and relationship of and between the entities.

In another implementation, the amendment documents are organized in an ordered set and the online document system generates the amended original document comprising the plurality of content sections each modified to include any amended content sections corresponding to the content section in a chronological order based on the ordered set of amendment documents. The online document system displays, within the document interface, the amended original document by displaying each of the plurality of content sections and, in conjunction with each content section, the amended content sections corresponding to the content section. The amended content sections are highlighted within the document interface.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 4 is a flowchart illustrating an example process for tracking amendments, according to an example embodiment.

Figure 1:
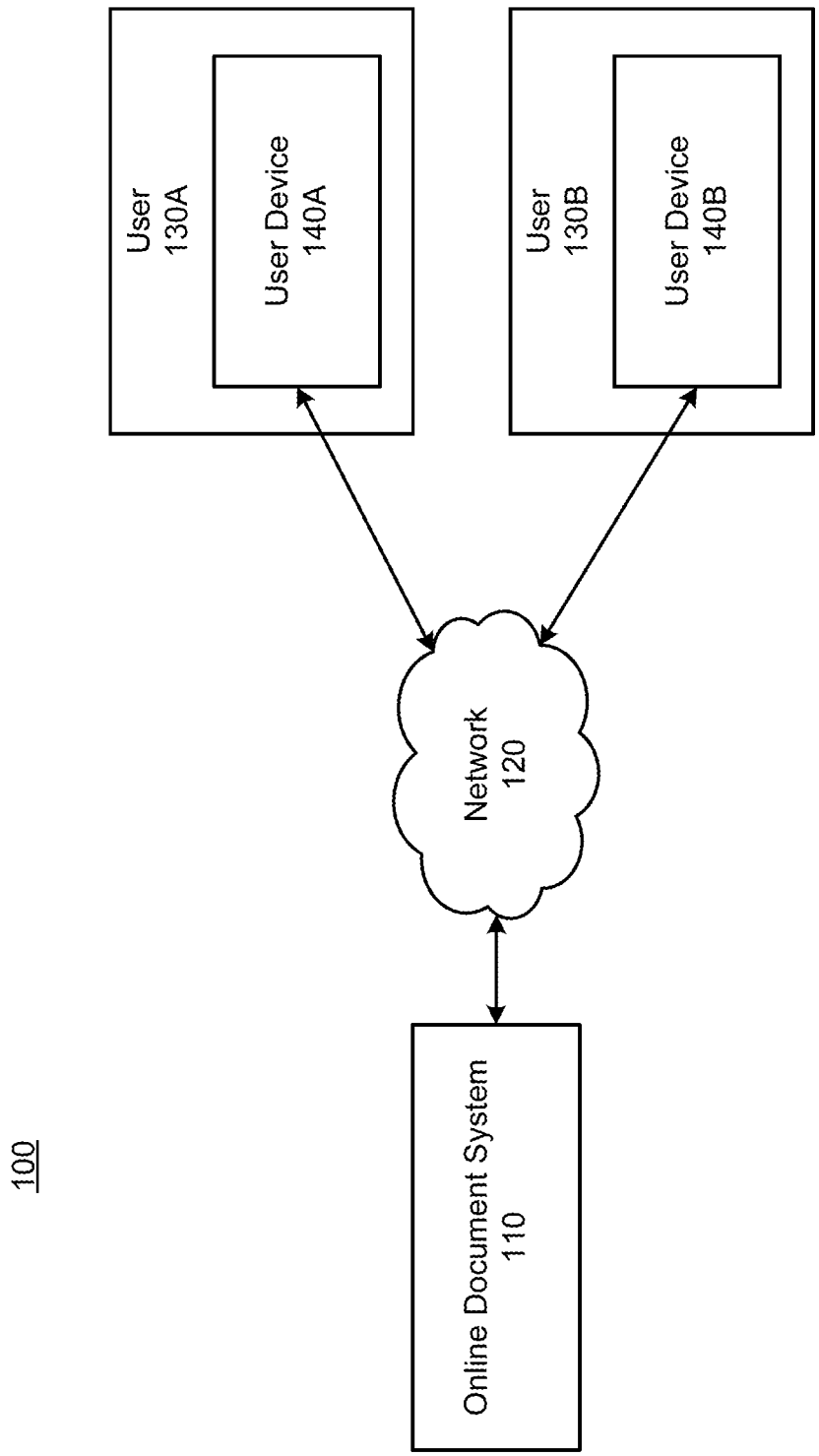
FIG. 1 is a block diagram of a system environment in which an online document system operates, according to an example embodiment.

The figures depict various embodiments for purposes of illustration only. One skilled in the art will readily recognize from the following discussion that alternative embodiments of the structures and methods illustrated herein may be employed without departing from the principles described herein.

The figures use like reference numerals to identify like elements. A letter after a reference numeral, such as "130A," indicates the text refers specifically to the element having that particular reference numeral. A reference numeral in the text without a following letter, such as "130," refers to any or all of the elements in the figures bearing that reference numeral (e.g., "130" in the text refers to reference numerals "130A" and "130B" in the figures).

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

A system environment can facilitate the creation, negotiation, execution, and management of documents in a document family by one or more users (also referred to as entities) of an online document system. For example, the online document system can allow users to manage, create, edit, review, negotiate and/or sign documents. Documents may include an original document, an amendment document, or an amended original document. An original document includes a plurality of content sections with each content section of the plurality including content (e.g., terms, language, images, etc.). An amendment document corresponds to an original document and includes one or more amendments. An amendment corresponds to a content section of the original document and to a type of amendment where the type of amendment describes how to modify the particular content section (e.g., by adding content to the content section, by substituting existing content with new content in the content section, or by deleting existing content in the content section). The amended original document includes the plurality of content sections of the original document modified to include any amendments.

As described above, two or more users may participate in many rounds of negotiation regarding a right or obligation represented in content sections of an original document within the system environment resulting in an amendment. As such, one or more users may create or import one or more amendment documents that correspond to the original document upon completion of negotiations. In some embodiments, during the course of negotiations and to track the various rights or obligations being proposed in the amendment documents, the online document system can apply a machine-learned model to the original document regarding a right or obligation represented in a content section thereof and the amendment documents to identify which content section(s) of the original document and the amendments of the amendment documents correspond to and what type of amendment (i.e., what type of modification) is to be performed on the content section(s). In some embodiments, to track a right or obligation represented in a content section of the original document and its corresponding amendments, the online document system applies the amendments to the original document in an ordered fashion (e.g., based on a chronological ordering of the amendment documents). The online document system generates an amended original document including the plurality of content sections modified to include each amendment corresponding to each content section based on the type of amendment.

The online document system can provide a document interface for a user to review the amended original document. Within the document interface, any modified content section may be highlighted by the online document system to signify to the user that the particular content section has been modified. In an instance, in response to agreeing to the content, terms, language, etc. in the plurality of content sections of the amended original document, the user can electronically execute the document. In another instance, in response to wanting to make any additional amendment(s) to the amended original document, the user can create or import a new amendment document to the online document system for further processing.

By utilizing the online document system described herein, a negotiation process involving an original document and one or more amendment documents is more efficient and requires less manual review (e.g., less manual tracking) of amendments. For example, by having the online document system automatically identify what content sections are modified and how they are modified, and by presenting this information to a user in an easy-to-understand manner, the user is less likely to overlook an amendment. Post-signing or post-document execution analysis of a document family can also be less time-consuming and less burdensome on a user (entity) as a result of the online document system automatically associating related rights and obligations in content sections of an original document and its corresponding amendment in an amendment document.

Likewise, by utilizing the online document system's ability to analyze portions, clauses, or terminology of the document, a user can review an amendment history for or lineage of rights or obligations governed by the document. Such an embodiment may be useful for users to analyze how a right or obligation evolved over time within the document. For example, for a negotiated and executed employment agreement, a user can review how the employee's salary changed throughout the negotiation process within a dedicated interface, which may provide insight into future salary negotiations.

The system environment described herein can be implemented within a document management system, a centralized document system, an electronic document system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Figure (FIG. 1 is a block diagram of a system environment in which an online document system operates, according an example embodiment. The system environment 100 shown by FIG. 1 includes an online document family system 110 (or simply "document system 110" hereinafter), a network 120, and a plurality of users 130 (e.g., a user 130A and a user 130B) each associated with a user device 140 (e.g., a user device 140A and a user device 140B, respectively). In alternative configurations, different and/or additional components may be included in the system environment 100.

The online document system 110 is a computer system (or group of computer systems) for storing and managing documents for the plurality of users 130. The documents may include original documents, amendment documents, and/or amended original documents. An original document includes a plurality of content sections with each content section of the plurality including content. Content can include terms, language, clauses, images, etc and represent a particular agreement right or obligation in such document. An amendment document corresponds to an original document and includes one or more amendments. An amendment corresponds to a content section of the original document and to a type of amendment where the type of amendment describes how to modify the particular content section (e.g., how to modify the content of the particular content section). In some instances, an amendment may include a payload of content to be added to a content section or to be substituted into a content section. The amended original document includes the plurality of content sections modified to include any amendments. Each document can be associated with additional information (e.g., metadata) such as an identifier, a reference number, or a timing identifier or timestamp.

Using the online document system 110, the users 130 can collaborate to create, edit, review, negotiate, and/or sign the documents, as well as track the lineage of evolving rights and obligations expressed in content sections of those documents. For example, the online document system 110 may facilitate a negotiation of an original document provided by the user 130A to the online document system 110 with the user 130B. To do so, the online document system 110 may access the original document and a set of amendment documents corresponding to the original document and track the amendments for the users 130. The set of amendment documents may be created or uploaded by one or both of the users 130. In order to track the amendments, in one implementation, the online document system 110 may apply a machine-learned model to the original document and the set of amendment documents. The machine-learned model is configured to identify, for each amendment document of the set, a content section of the plurality of content sections corresponding to each amendment and a type of amendment corresponding to each amendment. The online document system 110 then generates an amended original document comprising the plurality of content sections modified to include each amendment corresponding to each content section identified by the machine-learned model based on the type of amendment identified by the machine-learned model.

In another implementation, the online document system 110 identifies an order (e.g., a chronological order) to the amendment documents in the set. For example, the online document system 100 identifies the order to the amended documents based on metadata pertaining to the amendment documents, such any reference numbers associated with the amendment documents and/or any timing identifiers/timestamps associated with the amendment documents. The online document system 110 generates the amended original document comprising the plurality of content sections each modified to include any amended content sections corresponding to the content section in an order based on the ordered set of amendment documents.

The online document system 110 displays, within a document interface of a user device 140, the amended original document by displaying each of the plurality of content sections and, in conjunction with each content section, any amendments to the content section. The amended content sections are highlighted within the document interface to signify to the user 130 that the content section has been modified (amended). For example, any amended content (e.g., new content or deleted content) within a modified content section may be highlighted. In some embodiments, the online document system 110 displays, within the document interface of the user device 140, adjacent to any amendment, information about the amendment. The information can include an identifier corresponding to which amendment document of the set of amendment documents includes the amendment, the type of amendment (e.g., an addition, a substitution, a deletion, etc.), a timing identifier corresponding to the amendment document of the set that includes the amendment, any other information pertaining to the amendment, or any combination thereof.

The online document system 110 may include one or more servers, server groups, server clusters, and/or other suitable computing devices or systems of devices configured to implement the functions of the online document system 110. In some implementations, the online document system 110 communicates with the user devices 140 over the network 120 to receive instructions and/or documents (e.g., original documents, amendment documents, and/or amended original documents) for management by the online document system 110 and to send the documents (or other information) to users 130 via the user devices 140. The online document system 110 may assign varying permissions controlling which documents a user 130 can interact with (and what actions the user 130 can take on those documents). The online document system 110 will be discussed in further detail with respect to FIG. 2.

The network 120 transmits data within the system environment 100. The network 120 may comprise any combination of local area and/or wide area networks, using both wired and/or wireless communication systems, such as the Internet. In some embodiments, the network 120 transmits data over a single connection (e.g., a data component of a cellular signal, or Wi-Fi, among others), and/or over multiple connections. In some embodiments, the network 120 uses standard communications technologies and/or protocols. For example, the network 120 includes communication links using technologies such as Ethernet, 802.11, 3G, 4G, code division multiple access (CDMA), digital subscriber line (DSL), and the like. Data exchanged over the network 120 may be represented using any suitable format, such as hypertext markup language (HTML) or extensible markup language (XML). In some embodiments, the network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through the network 120, the online document system 110 can communicate with the user devices 140 associated with the users 130. A user 130 may be an individual, an organization, an entity, a group, a company, an account, etc. Each user 130A, 130B can interact with documents (or other content) generated on and/or managed by the online document system 110. Each user 130 can be associated with a username, email address, user account, or other identifier that can be used by the online document system 110 to identify the user 130 and to control the ability of the user 130 to view, modify, or otherwise interact with documents managed by the online document system 110. In an example implementation, the user 130A can interact with the online document system 110 through their user account with the online document system 110 and the user device 140A accessible to that user 130A.

Each user device 140 is a computing device capable of receiving user input (e.g., from a user 130) as well as transmitting data to and/or receiving data from the online document system 110 via the network 120. For example, a user device 140 can be a desktop or a laptop computer, a smartphone, tablet, or another suitable device. User devices 140 may be configured to communicate via the network 120 (e.g., with the online document system 110). In one embodiment, a user device 140 executes an application allowing a user of the user device 140 to interact with the online document system 110. For example, a user device 140 can execute a browser application to enable interaction between the user device 140 and the online document system 110 via the network 120. In some embodiments, a single user can be associated with multiple user devices 140 and/or one user device 140 can be shared between multiple users who may, for example, log into a personal account on the user device 140 to access the online document system 110.

Example Online Document System Architecture

Figure 2:
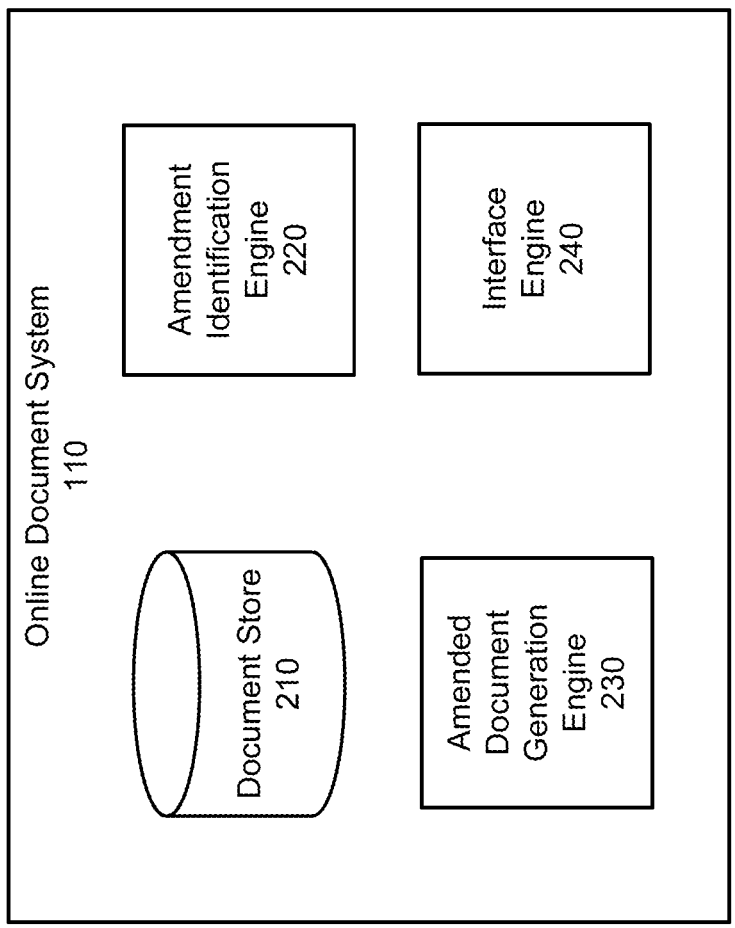
FIG. 2 is a block diagram of an online document system, according to an example embodiment.

FIG. 2 is a block diagram of an online document system, according to an example embodiment. The environment 200 of FIG. 2 shows an online document system 110 including a document store 210, an amendment identification engine 220, an amended document generation engine 230, and an interface engine 240. In various embodiments, the online document system 110 may include fewer or additional components that are not shown in FIG. 2. For example, conventional components such as network interfaces, security functions, load balancers, failover servers, management and network operations consoles, and the like are not shown so as to not obscure the details of the system architecture. The functions of the online document system 110 may be distributed among the components in a different manner than described.

The document store 210 is a file storage system, database, set of databases, or other data storage system storing documents and other information about documents managed by the online document system 110. Documents stored in the document store 210 may include original documents, amendment documents, and/or amended original documents as described in more detail above. In addition to a document itself, the document store 210 may store additional information (or metadata) about the document, such as an identifier for the document (e.g., a filename), a reference number of the document (e.g., 3 of 15), a timing identifier or timestamp of the document (e.g., a creation date, an upload date, etc.). In some embodiments, the document store 210 can store one or more training sets of annotated documents.

In some embodiments, the document store 210 may store a document that is uploaded by a user 130 of the online document system 110 via a user device 140. For example, the document store 210 receives and stores a document (e.g., an original document) generated by the user 130A using their user device 140A. In some embodiments, the document store 210 may store a document that is created by the user 130 using the online document system 110. For example, the document store 210 receives and stores a document (e.g., an amendment document) created by the user 130B within the online document system 110. The document store 210 can be implemented locally, remotely, using cloud computing services, or using any other suitable hardware or software techniques to store data.

The amendment identification engine 220 accesses an original document comprising a plurality of content sections. In some embodiments, the amendment identification engine 220 may access the original document from the document store 210. In some embodiments, the amendment identification engine 220 may receive the original document directly from a user 130. The plurality of content sections of the original document each include content and corresponding metadata. The content may be made up of a payload of a plurality of characters that includes text (e.g., letters, numbers, symbols, etc.). Metadata of a content section may include an identifier, label, annotation, or other indication corresponding a right or obligation. As an example, a content section may include a payload of "Payment shall be USD $1000 per month." and a metadata of PAYMENT to indicate a payment obligation expressed in that content section.

The amendment identification engine 220 accesses a set of amendment documents. The set of amendment documents may include any number of amendment documents. Each amendment document includes one or more amendments with each amendment corresponding to a content section of the plurality of content sections of the original document and to a type of amendment as described in more detail above. In some instances, an amendment may include a payload of content to be added to a content section or to be substituted into a content section and metadata corresponding to the payload to indicate the applicable right or obligation to which the content relates. An amendment document includes a plurality of characters that includes text (e.g., letters, numbers, symbols, etc.), similar to the original document as described above. In some embodiments, the amendment identification engine 220 may access the set of amendment documents from the document store 210. In some embodiments, the amendment identification engine 220 may receive the set of amendment documents directly from one or more users 130.

The amendment identification engine 220 may identify content included in the original document and the set of amendment documents. In some embodiments, the amendment identification engine 220 first performs one or more processing techniques on the original document and/or on one or more amendment documents in the set of amendment documents. For example, the original document and/or one or more amendment documents may be in a document format (e.g., an image of a document, pdf, etc.) that does not have recognizable characters. The amendment identification engine 220 performs one or more known processing techniques (e.g., one or more character identification techniques, such as, optical character recognition (OCR)) on these documents to identify the characters and a corresponding location of the characters (e.g., a location coordinate or a set of location coordinates) within the documents. In some embodiments, the amendment identification engine 220 may group adjacent characters, based on locations of the characters, together to identify an ordered set of characters. For example, an ordered set of characters may form a word (e.g., a series of adjacent letters) or a combination of a letters and/or numbers (e.g., a series of adjacent letters and/or numbers). In other embodiments, the amendment identification engine 220 may generate a table or list of payloads and corresponding annotations (or other applicable metadata) in each of the original document and associated amendment documents.

In some implementations, the amendment identification engine 220 can identify the content section and the type of amendment for each amendment by utilizing a machine-learned model. For example, the amendment identification engine 220 inputs the original document and the set of amendment documents into the machine-learned model and the machine-learned model identifies a content section and a type of amendment for each amendment. In some embodiments, the amendment identification engine 220 inputs the identified characters and/or identified ordered sets of characters of the original document and of each amendment document into the machine-learned model. The machine-learned model then identifies a content section and a type of amendment for each amendment based on the identified characters and/or identified ordered sets of characters. In yet other embodiments, the amendment identification engine 220 performs a mapping of content sections and amendments between respective documents based on equivalent, matching, or otherwise corresponding annotations.

The machine-learned model can be trained to determine relationships between identified characters and/or identified ordered sets of characters and corresponding content sections. The machine-learned model may also be trained to determine relationships between identified characters and/or identified ordered sets of characters and corresponding types of amendments. In some embodiments, a separate machine-learned model may be trained by the amendment identification engine 220 to determine relationships between identified characters and/or identified ordered sets of characters and corresponding types of amendments.

During training, the machine-learned model may be trained using a training set of annotated documents that include annotated original documents and corresponding annotated amendment documents. An annotated original document comprises a plurality of content sections where at least one content section of the plurality is annotated (labeled) to indicate an amendment. Corresponding annotated amendment documents each comprise one or more amendments. In some embodiments, an annotated amendment document includes at least one annotated (labeled) amendment where the annotation (label) indicates a content section and a type of amendment.

In some embodiments, the annotations or labels in the annotated original document enable the machine-learned model to associate identified characters and/or identified ordered sets of characters included in a content section with an amendment included in an amendment document. In some embodiments, the annotations or labels in an amendment document enable the machine-learned model to associate identified characters and/or identified ordered sets of characters included in an amendment with a particular content section of the original document or with a particular type of amendment. For example, certain characters and/or ordered sets of characters are commonly associated with identifying a content section in an original document and in an amendment. Other certain characters and/or ordered sets of characters are commonly associated with identifying a type of amendment. For example, an annotated original document in the training set may include a labeled first ordered set of characters, such as "Section 7.13", that identifies a particular content section and a labeled second ordered set of characters, such as a payload of content, that identifies a particular type of amendment. In the same example, an amendment in a corresponding annotated amendment document may include a same labeled ordered set of characters, i.e. "Section 7.13", identifying the particular content section and another labeled ordered set of characters, such as "replaced by" followed by the payload of content, that identifies a particular type of amendment (i.e., a substitution of content).

The amendment identification engine 220 uses supervised or unsupervised machine learning to train the machine-learned model using the training set. Different machine learning techniques may be used in various embodiments, such as linear support vector machines (linear SVM), boosting for other algorithms (e.g., AdaBoost), neural networks, logistic regression, naïve Bayes, memory-based learning, random forests, bagged trees, decision trees, boosted trees, boosted stumps, or any other suitable machine learning technique.

During operation, the amendment identification engine 220 inputs identified characters and/or identified ordered sets of characters of the original document and identified characters and/or identified ordered sets of characters of the corresponding set of amendment documents into the machine-learned model to identify a content section and a type of amendment for each amendment within the amendment documents. In some embodiments, the machine-learned model may output probabilities (or likelihoods) that an amendment corresponds to a content section and/or corresponds to a type of amendment. For example, for a first amendment, the machine-learned model outputs a first set of probabilities that the first amendment is related to any of the content sections included in the original document and a second set of probabilities that the first amendment is related to any of the types of amendments. In some instances, a higher probability within the first set of probabilities (e.g., above 75%, above 80%, etc.) indicates the amendment is more likely to be related to a particular content section and a higher probability within the second set of probabilities indicates the amendment is more likely to be related to a particular type of amendment.

In an example, the amendment identification engine 220 may receive a sales agreement (i.e., an original agreement) from the document store 210. The sales agreement was provided to the document store 210 by user 130A. The sales agreement may include three different content sections: a first content section that is indicated by a first ordered set of characters (e.g., "Section 1"), a second content section that is indicated by a second ordered set of characters (e.g., "Section 2"), and a third content section that is indicated by a third ordered set of characters (e.g., "Section 3").

Continuing with this example, a negotiation is taking place between the user 130A and the user 130B in regard to the sales agreement. As such, during the negotiation, various amendment documents corresponding to the sales agreement may be generated by the user 130A and/or the user 130B. For example, the user 130B may create/upload a first amendment document to the amendment identification engine 220 and the user 130A may create/upload a second amendment document to the amendment identification engine 220. The first amendment document may include two amendments: a first amendment that corresponds to the first content section and is an addition of content to the first content section and a second amendment that corresponds to the second content section and is a substitution of content to the second content section. The second amendment document may include a third amendment that corresponds to the first content section and is a deletion of content in the first content section.

The amendment identification engine 220 may identify the characters and/or ordered sets of characters of the sales agreement, the characters and/or ordered sets of characters of the first amendment document, and the characters and/or ordered sets of characters of the second amendment document. The amendment identification engine 220 may input the identified characters and/or identified ordered sets of characters into the machine-learned model to identify, for each amendment in the first and second amendment documents, a content section and a type of amendment. For example, the sales agreement includes the identified ordered sets of characters "Section 1", "Section 2", and "Section 3" mentioned above. The first amendment document includes the identified ordered set characters "The following will be added to Section 1:" in the first amendment and "Section 2, sentence 2 is hereby superseded by:" in the second amendment. The second amendment document includes the identified ordered set of characters "The following will be removed from Section 1:" in the third amendment. The machine-learned model may output [1, 0, 0] as a first set of probabilities that the first amendment is related to the corresponding content sections included in the sales agreement where each entry in the set corresponds to each content section and [1, 0, 0] as a second set of probabilities that the first amendment is related to the types of amendments where each entry corresponds to each type of amendment (e.g., [addition, substitution, deletion]). Additionally, the machine-learned model, for the second amendment, may output [0, 1, 0] as a first set of probabilities and [0, 1, 0] as a second set of probabilities and, for the third amendment, may output [1, 0, 0] as a first set of probabilities and [0, 0, 1] as a second set of probabilities.

In some implementations, the amendment identification engine 220 may utilize a heuristics-based approach for identifying a content section and a type of amendment associated with each amendment included in each amendment document of a set of amendment documents. For example, the amendment identification engine 220 compares characters and/or ordered sets of characters identified in each amendment document to a listing (or table) of characters and/or ordered sets of characters and their associated content section or type of amendment.

For example, to identify a content section associated with an amendment using the heuristics-based approach, the amendment identification engine 220 may generate a listing of each content section included in the plurality of content sections of the original document. The amendment identification engine 220 does so by first identifying the characters and/or ordered sets of characters in the original document and comparing the identified characters and/or ordered sets of characters of the original document to a listing of commonly-used characters and/or ordered sets of characters that correspond to content sections. For example, commonly-used characters and/or ordered sets of characters that correspond to content sections may include "Paragraph 2", "Section 3.6.2", "2.7", "IV", etc. Next, the amendment identification engine 220 generates a listing of the identified content sections of the original document based on the comparison. The amendment identification engine 220 then identifies the characters and/or ordered sets of characters in an amendment document and compares the identified characters and/or ordered sets of characters to the generated listing of identified content sections of the original document. The amendment identification engine 220 identifies a match and thus identifies a content section for each amendment in the amendment document.

To identify a type of amendment associated with an amendment using the heuristics-based approach, the amendment identification engine 220 may compare the identified characters in the amendment to a listing of commonly-used characters and/or ordered sets of characters that correspond to types of amendments (e.g., additions, substitutions, or deletions). Commonly-used characters and/or ordered sets of characters that correspond to additions may include "this shall also apply", "in addition to", "appended with", "add on", etc. Commonly-used characters and/or ordered sets of characters that correspond to substitutions may include "superseded", "substituted", "replaced", etc. Commonly-used characters and/or ordered sets of characters that correspond to deletions may include "remove", "deleted", etc. Based on the comparison, the amendment identification engine 220 can identify a type of amendment.

In some embodiments, the amendment identification engine 220 sorts all of the amendment documents included in the set of amendment documents by a time order (e.g., chronologically). For example, the amendment identification engine 220 refers to information (metadata) corresponding to each amendment document of the set of amendment documents to sort the documents. With each amendment document including metadata (e.g., a timing identifier/timestamp), the amendment identification engine 220 can sort the amendment documents based on each amendment document's corresponding timing identifier. In some implementations, each amendment document in the set of amendment documents may be a different version of the original document. For example, as the original document is passed back and forth between users 130 in a negotiation, the original document is amended by a first user 130 and becomes a first amendment document (a different version of the original document) in the set of amendment documents. Then, the first amendment document is amended by a second user 130 and becomes a second amendment document (another different version of the original document) in the set of amendment documents. The amendment identification engine 220 sorts the amendment documents in the set of amendment documents to track the different amendments made to the original document over time.

The amendment document generation engine 230 generates an amended original document that includes the plurality of content sections modified to include any amendments to the content sections. For example, the amendment document generation engine 230 modifies (or amends) a content section of the original document to include any amendment identified by the amendment identification engine 220 that corresponds to that content section to generate the amended original document. In some embodiments, the amendment document generation engine 230 generates the amended original document based on output from the machine-learned model of the amendment identification engine 220. In other embodiments, the amended document generation engine 230 generates the amended original document to include any amendments to content section(s) in an order (e.g., a time order) based on the ordered set of amendments and/or ordered set of amendment documents. In some embodiments, depending on the type of amendment, the amendment document generation engine 230 may add content to an amended content section, may substitute existing content with new content in an amended content section, or may delete content from an amended content section.

Continuing with the sales agreement negotiation example, the amendment document generation engine 230 generates an amended original document (i.e., an amended sales agreement). The amended sales agreement will include the first, second, and third amendments identified by the amendment identification engine 220. For example, in regard to the first content section, the amended sales agreement will include the first amendment and the third amendment. Specifically, additional content will be added to Section 1 and existing content will be removed from Section 1 in the amended sales agreement.

The interface engine 240 generates document interfaces for display to users 130. The interface engine 240 allows users 130 to interact with documents managed by the online document system 110, according to some embodiments. For example, the interface engine 240 can receive user instructions from a web-based or mobile-based application the user 130 interacts with via a user device 140 to provide instructions to the online document system 110. In some implementations, the interface engine 240 provides a document interface enabling users 130 to create or upload a document (e.g., an original document or an amendment document) to the online document system 110. The interface engine 240 may also provide document interfaces enabling users 130 to review and/or electronically execute a document.

In some implementations, the interface engine 240 displays to a user 130 a document interface including an amended original document with one or more modified content sections. The modified content sections can include highlighted amendments. Highlighted amendments call attention to any amendments included in the modified content section and/or signify to the user 130 where any amendments are located within the modified content section. A highlighted amendment can include visual indicators, such as a box surrounding the amendment, a circle surrounding the amendment, a color highlight applied to text of the amendment, a text box located adjacent to the amendment, a change of font size, font color, and/or font type of the amendment, or any combination thereof. In some embodiments, amendments from a same amendment document are highlighted in a similar fashion. For example, any amendment from a first amendment document may be highlighted in the amended original document with a first font color and any amendment from a second amendment document maybe highlighted in the amended original document with a second font color that is different from the first font color.

The interface engine 240 can display to a user 130 one or more interface elements (e.g., links, buttons, icons, etc.) that the user 130 can interact with to instruct the online document system 110 to perform an action and/or to view additional information. For example, the interface engine 240 may present to a user 130 an interface element adjacent to an amendment that upon selection by the user 130 (e.g., by the user 130 clicking on, by the user 130 hovering a pointer over, etc.) presents information about the amendment to the user 130. The information can include an identifier corresponding to which amendment document of the set of amendment documents includes the amendment, the type of amendment (e.g., an addition, a substitution, a deletion, etc.), a timing identifier or timestamp corresponding to the amendment document of the set of amendment documents that includes the amendment, any other information pertaining to the amendment, or any combination thereof. For example, the identifier may include a name of the amendment document (e.g., a filename) and/or a reference number of the amendment document within the set (e.g., 1 of 20) and the timing identifier or timestamp may include a creation date of the amendment document and/or an upload date of the amendment document.

The interface engine 240 can provide a means for a user 130 to provide user feedback corresponding to the amended original document. For example, the interface engine 240 may display an interface element that the user 130 may select to approve the amended original document. In some embodiments, the user 130 may provide user feedback corresponding to approval of the amended original document by signing (electronically executing) the document. In another example, the interface engine 240 may display an interface element that the user 130 may select to update one or more content sections of the plurality of content sections. In some embodiments, the user 130 may provide user feedback corresponding to wanting to update one or more content sections by uploading/generating a new amendment document. In yet another example, the interface engine 240 may display an interface element that the user 130 may select to disapprove of the amended original document. For example, a user 130 may review the original document, the set of amendment document, and the amended original document and disagree with one or more of the modified content sections as generated by the online document system 110. The interface engine 240 provides a means for the user 130 to communicate this disapproval to the online document system 110 and/or to other users 130 involved in the negotiation.

Based on the user feedback, the machine-learned model utilized by the amendment identification engine 220 may be re-trained. For example, the amendment identification engine 220 may update the training set to include user-updated documents. User-updated documents may include a user-updated amended original document and corresponding set of amendment documents. A user 130 may update one or more content sections of the amended original document presented by the interface engine 240. For example, the user 130 may modify one or more content sections to include a corresponding amendment or the user 130 may modify one or more content sections to not include an amendment.

Example Document Interfaces

Figure 3A:
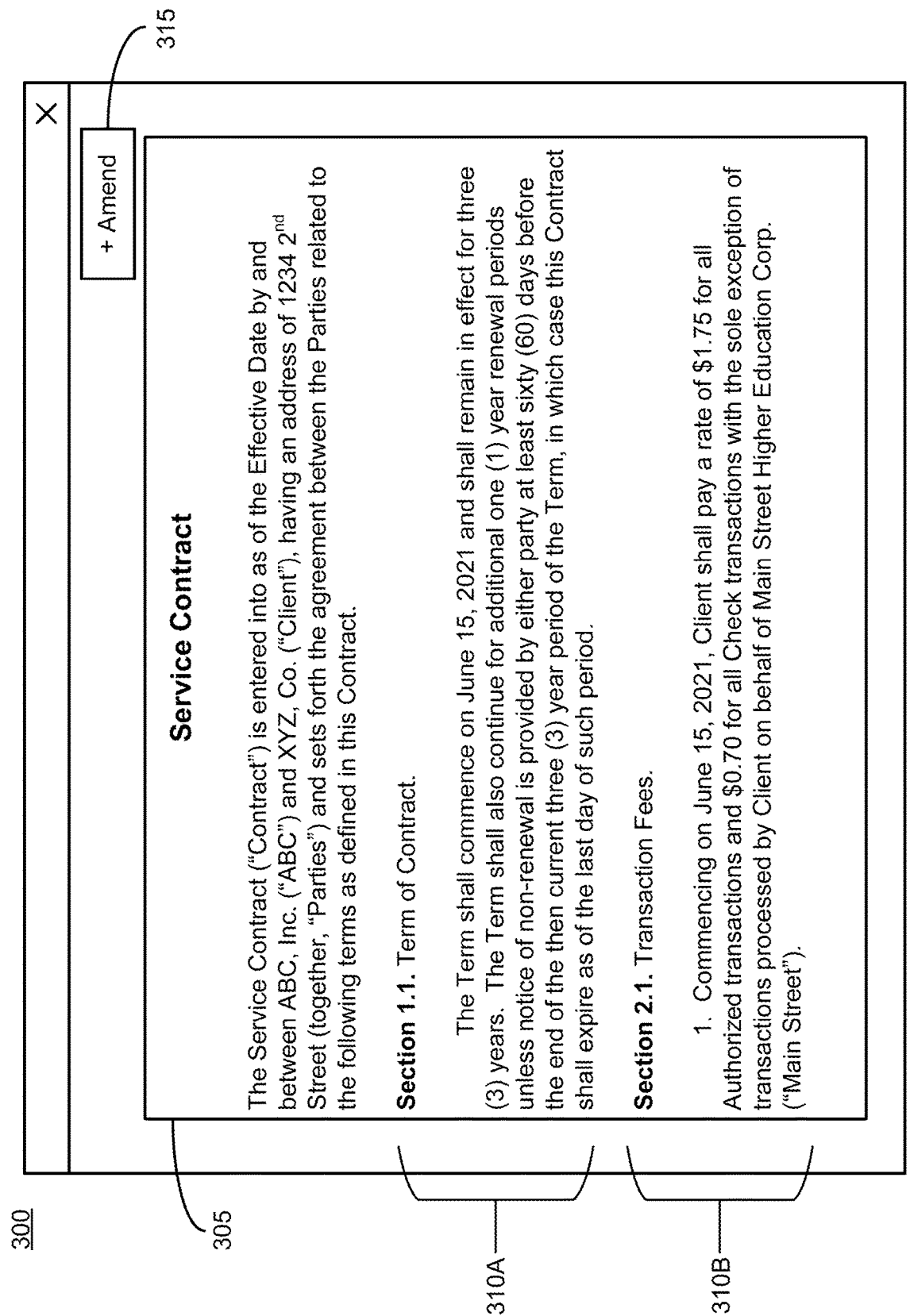
FIG. 3A illustrates a first example document interface displaying an original document, according to an example embodiment.

FIG. 3A illustrates a first example document interface displaying an original document, according to an example embodiment. The first example document interface 300 displays an original document 305. The original document 305 includes a plurality of content sections 310 (e.g., a first content section 310A and a second content section 310B). The first example document interface 300 may be displayed by the interface engine 240 to a user 130B ("XYZ, Co.") when the user 130B is reviewing the original document 305 during a negotiation process between the user 130A ("ABC, Inc.") and the user 130B. During their review, the user 130B may decide that they want to amend one or more content sections 310. To do so, the user 130B may select an interface element 315 providing the user 130B with an opportunity to generate an amendment document 325 that is described in further detail below in FIG. 3B.

Figure 3B:
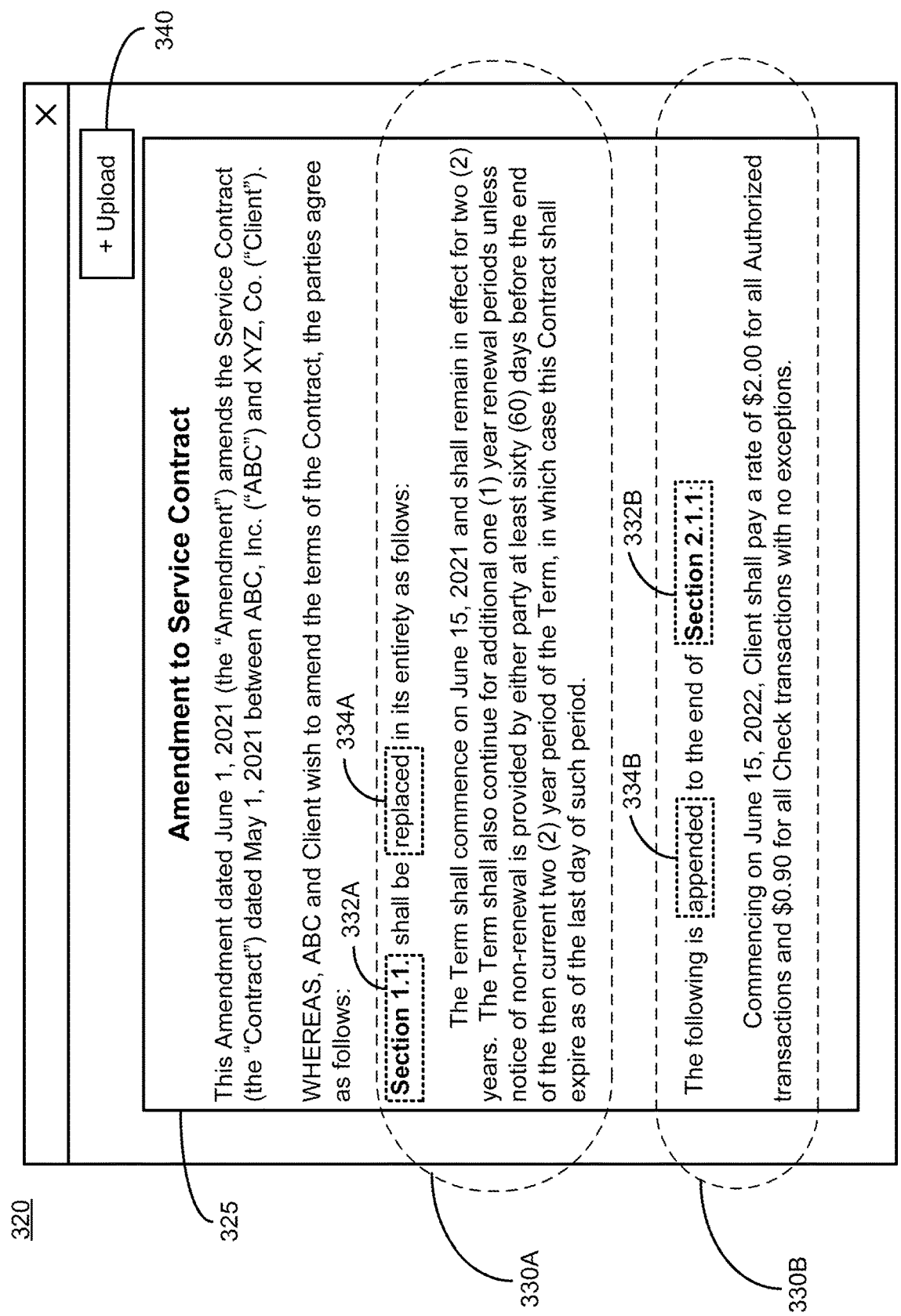
FIG. 3B illustrates a second example document interface displaying an amendment document, according to an example embodiment.

FIG. 3B illustrates a second example document interface displaying an amendment document, according to an example embodiment. The second example document interface 320 displays an amendment document 325. The amendment document 325 includes one or more amendments 330 (e.g., an amendment 330A and an amendment 330B). Each amendment 330A, 330B includes at least two ordered sets of characters (e.g., a first ordered set of characters 332 and a second ordered set of characters 334). The first ordered set of characters 332 corresponds to a content section of the original document 305. The second ordered set of characters 334 corresponds to a type of amendment. For example, the amendment 330A includes a first ordered set of characters 332A (e.g., "Section 1.1") that corresponds to the content section 310A and a second ordered set of characters 334A (e.g., "replaced") that corresponds to a type of amendment. In this example, the amendment 330A proposed by the user 130B includes replacing (substituting) content currently in content section 110A of the original document 305 with a payload of content in amendment 330A. In amendment 330B, the first ordered set of characters 332B (e.g., "Section 2.1.1") corresponds to content section 110B in the original document 305 and the second ordered set of characters 334B (e.g., "appended") corresponds to a type of amendment. For this amendment, the user 130B proposes appending (adding) a payload of content to content section 110B. When the user 130B is finished creating the amendment document 325, the user 130B may select an interface element 340 that provides the amendment document 325 to the online document system 110 and to user 130A.

Figure 3C:
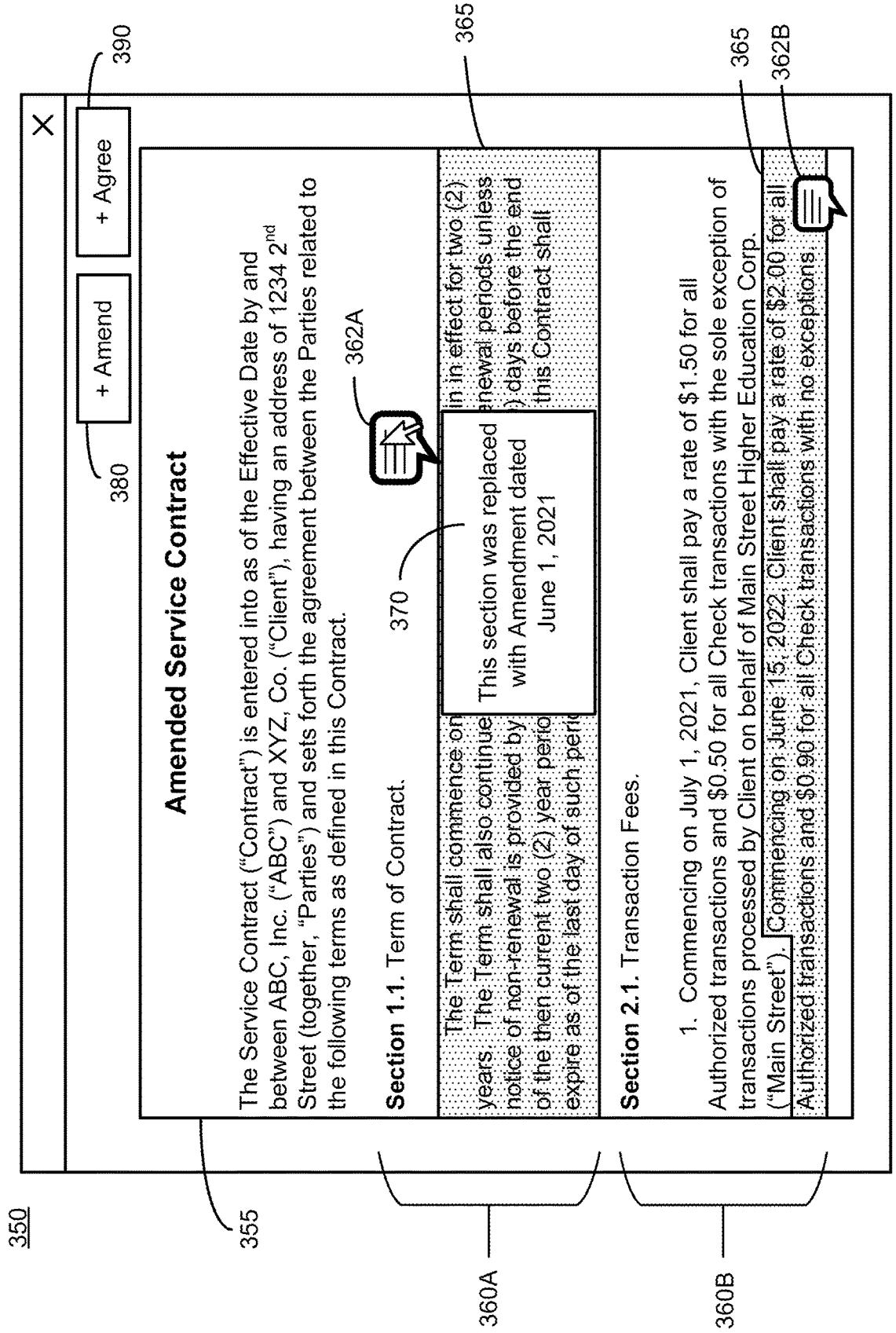
FIG. 3C illustrates a third example document interface displaying an amended original document, according to an example embodiment.

FIG. 3C illustrates a third example document interface displaying an amended original document, according to an example embodiment. The third example document interface 350 displays an amended original document 355. The amended original document 355 includes a plurality of content sections 360 (e.g., a content section 360A and a content section 360B) that correspond to the plurality of content sections 310 from the original document 305. One or more of the plurality of content sections 360 may have been modified by the online document system 110 to include any amendments 330 from the amendment document 325. For example, the content section 310A of the original document 305 was modified by the online document system 110 to become the content section 360A in the amended original document 355 based on the amendment 330A in the amendment document 325.

The third example document interface 350 may be displayed by the interface engine 240 to a user 130A when the user 130A is reviewing the amended original document 355 during the negotiation process between the user 130A and the user 130B. During their review, the user 130A can easily determine which content sections 110 of the original document 305 have been modified and which content (e.g., text) within the content sections 110 has been modified due to the online document system 110 highlighting 365 the amendments 330 in the amended original document 355. Additionally, the user 130A may select an interface element 362 (e.g., an interface element 362A and an interface element 362B), for example by hovering over the interface element 362 with a pointer, to view additional information about a corresponding amendment 330. For example, the user 130A hovers the pointer over interface element 362A and additional information 370 is displayed by the interface engine 240 in the document interface 350. The additional information 370 informs the user 130A what type of amendment is taking place in the modified content section 360A (e.g., a replacement) and when the modification took place (e.g., a timing identifier of Jun. 1, 2021). If the user 130A wanted to know additional information about the amendment 330B that modified the content section 360B, the user 130A can select the interface element 362B. In one instance, the user 130A may want to continue the negotiation process with the user 130B and generates another amendment document (not shown). To do so, the user 130A can select an interface element 380 to create another amendment document using the online document system 110 or to upload another amendment document to the online document system 110. In another instance, the user 130A may agree to the amended original document 355 by selecting an interface element 390 and the negotiation process comes to an end.

Although not illustrated in the examples of FIGS. 3A-3C, the interface engine 240 can generate interfaces displaying amendments or changes made to content sections of documents that affect rights or obligations detailed within the documents. For instance, the amendment identification engine 220 can parse a document to identify clauses, terms, or passages associated with rights or obligations of a party to an agreement, such as payment terms, liability clauses, manufacturing or goods delivered obligations, service obligations, asset transfer clauses, indemnification clauses, and the like.

Once document content sections associated with rights or obligations are identified, the amendment identification engine 220 can track amendments made to the identified content sections that affect the rights or obligations. In some embodiments, the amendment identification engine 220 can identify substantive amendments that materially affect the rights or obligations, such as amendments to costs or financial terms, amendments to liability limitations, amendments to identified parties or entities, amendments to a quantity or type of goods or services provided, amendments to dates, and the like. Likewise, the amendment identification engine 220 can identify non-substantive amendments that do not materially affect the rights or obligations, such as certain edits to grammar, amendments to fix typos, and the like.

The interface engine 240 can generate an interface corresponding to a right or obligation associated with a document. For example, in a services provided agreement, the interface engine 240 can generate an interface associated with a cost of the provided service. The interface engine 240 can populate the generated interface with substantive amendments made to the underlying document that affect the right or obligation (such as amendments made to the cost of the provided service of the previous example), and can organize the amendments chronologically, enabling a user to review how the agreement on the right or obligation evolved over time. By displaying consolidating substantive amendments that affect the right or obligation within the interface, a user is able to focus on the material changes to the right or obligation more efficiently, without having to consider before dismissing non-substantive amendments.

Example Processes for Managing Amendment Tracking

FIG. 4 is a flowchart illustrating an example process for tracking amendments, according to an example embodiment. The process 400 shown in FIG. 4 may be performed by components of an online document system (e.g., the online document system 110). Other entities may perform some or all of the steps in FIG. 4 in other embodiments. It should be noted that in other embodiments, the process 400 illustrated in FIG. 4 can include, fewer, additional, or different steps than those described herein.

The online document system accesses 410 an original document comprising a plurality of content sections. In some embodiments, the original document may be created by a user utilizing the online document system. In some embodiments, the original document may be uploaded by the user to the online document system. The plurality of content sections of the original document each include content. The content may be made up of a plurality of characters that includes text (e.g., letters, numbers, symbols, etc.).

The online document system accesses 420 a set of amendment documents each comprising one or more amendments to the original document. The set of amendment documents may include any number of amendment documents. Each amendment document includes one or more amendments with each amendment corresponding to a content section of the plurality of content sections of the original document and to a type of amendment. A type of amendment may include an addition amendment, a substitution (replacement) amendment, or a deletion amendment. In some instances, an amendment may include a payload of content to be added to a content section or to be substituted into a content section. An amendment document also includes a plurality of characters that includes text, similar to the original document as described above. In some embodiments, the set of amendment documents may be created by a user utilizing the online document store. In some embodiments, the set of amendment documents may be uploaded by the user to the online document system.

The online document system applies 430 a machine-learned model to the original document and the set of amendment documents to identify, for each amendment document of the set of amendment documents, a content section of the plurality of content sections corresponding to each amendment of the one or more amendments and a type of amendment corresponding to each amendment of the one or more amendments. In some embodiments, the online document system first identifies characters and/or ordered sets of characters from the original document and the set of amendment documents. Then, the online document system inputs the identified characters and/or identified ordered sets of characters into the machine-learned model. The machine-learning model may be trained by the online document system to determine probabilities or likelihoods that an amendment corresponds to a content section of the plurality of content sections and corresponds to a type of amendment. For example, the machine-learned model determines if the identified characters and/or the identified ordered sets of characters of an amendment correspond to a content section and to a type of amendment.

The online document system generates 440 an amended original document comprising the plurality of content sections modified to include each amendment corresponding to each content section identified by the machine-learned model. For example, the online document system amends (modifies) any content section of the plurality of content sections to include any amendments to generate the amended original document. In some embodiments, depending on the type of amendment, the online document system may add content to a content section to modify the content section, may substitute existing content with new content in a content section to modify the content section, or may delete content from a content section to modify the content section.

The online document system displays 450 the amended original document. The amended original document includes the plurality of content sections and, in conjunction with each content section, any amendments corresponding to the content section are highlighted. By highlighting the amendments in the amended original document presented to the user, the online document system brings any and all amendments to the attention of the user. An amendment may be highlighted by having a box displayed surrounding the amendment, a circle displayed surrounding the amendment, a color highlight applied to text of the amendment, a text box displayed adjacent to the amendment, a change of font size, font color, and/or font type of the amendment, or any combination thereof. The generation and presentation of the amended original document to a user by the online document system, provides the user with a more efficient and less-error prone way to track amendments made to an original document during a negation process.

Figure 5:
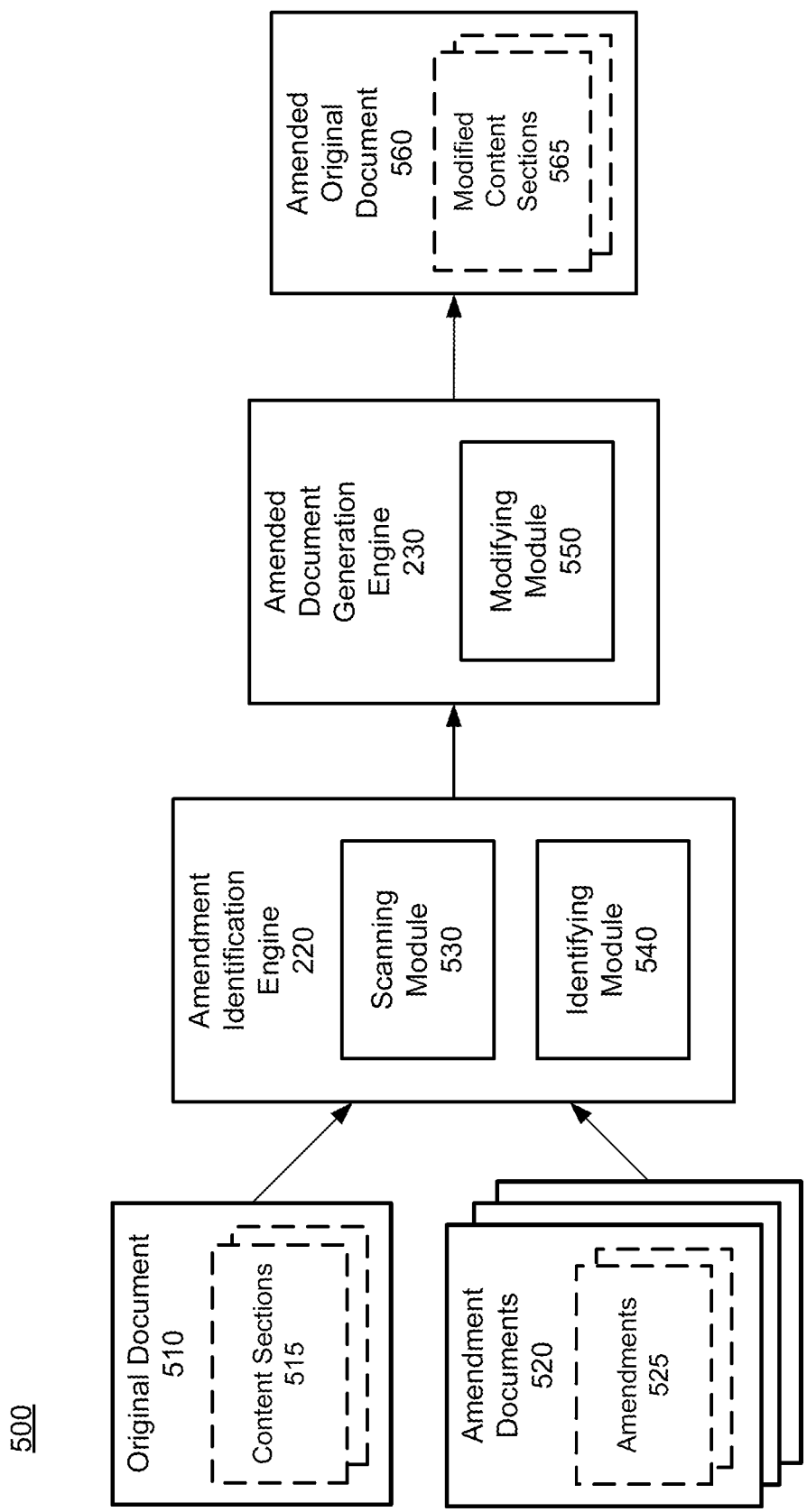
FIG. 5 illustrates a data flow diagram for generating an amended original document from an original document and a set of amendment documents, according to an example embodiment.

FIG. 5 illustrates a data flow diagram for generating an amended original document from an original document and a set of amendment documents, according to an example embodiment. The generation of the amended original document 560 from the original document 510 and the set of amendment documents 520 may be performed by the amendment identification engine 220 and the amended document generation engine 230 of the online document system 110. Embodiments of the data flow diagram 500 may include different and/or additional modules.

The original document 510 includes a plurality of content sections 515 and a set of amendment documents 520 are provided to the amendment identification engine 220. Each amendment document of the set of amendment documents 520 includes one or more amendments 525. Each amendment is identified and tracked by the amendment identification engine 220 of the online document system 110, as described in further detail above. In some embodiments, the amendment identification engine 220 may utilize a scanning module 530 and an identifying module 540 to perform the amendment identification and tracking. The scanning module 530 identifies characters and/or ordered sets of characters within the original document 510 and each of the amendment documents in the set 520. The scanning module 530 may utilize known optical character recognition techniques to do so.

The identifying module 540 identifies, for each amendment of the one or more amendments 525 for each amendment document of the set of amendment documents 520, a content section of the plurality of content sections 515 corresponding to the amendment and a type of amendment corresponding to the amendment. In one embodiment, the identifying module 540 utilizes a machine-learned model to identify a content section and a type of amendment corresponding to each amendment. In another embodiment, the identifying module 540 utilizes a heuristics-based approach to identify a content section and a type of amendment corresponding to each amendment. In some embodiments, the identifying module 540 sorts all of the amendments included in the set of amendment documents 520 by a time order. For example, the identifying module 540 refers to information (metadata) corresponding to each amendment document of the set of amendment documents 520 to sort the amendments. With each amendment document including metadata (e.g., a timing identifier), the identifying module 540 can sort the corresponding amendments included in each amendment document based on the metadata.

The amended document generation engine 230 generates the amended original document 560. In some embodiments, the amended document generation engine 230 utilizes a modifying module 550 to generate the amended original document 560. In one embodiment, the modifying module 550 generates the amended original document 560 comprising a plurality of modified content sections 565 that include the plurality of content sections 515 of the original document 510 modified to include each amendment identified by the identifying module 540. For example, the modifying module 550 may generate the amended original document 560 to include each amendment corresponding to each content section identified by the machine-learned model based on the type of amendment identified by the machine-learned model. In another example, the modifying module 550 may generate the amended original document 560 to include amendments corresponding to each content section in an order (e.g., time order) based on the ordered set of amendment documents. The amended original document 560 may be presented to one or more users, for example involved in a negotiation of the original document 510. Any amendments included in the modified content sections 565 may be highlighted when presented to the users.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
accessing, by an online document system, an original document comprising a plurality of content sections;
accessing, by the online document system, a set of amendment documents each comprising one or more amendments to the original document;
applying, by the online document system, a machine-learned model to the original document and the set of amendment documents, the machine-learned model configured to identify, for each amendment document of the set of amendment documents, a content section of the plurality of content sections corresponding to each amendment of the one or more amendments and a type of amendment corresponding to each amendment of the one or more amendments, wherein the machine-learned model is trained using a training set of labeled documents that include labeled original documents and corresponding labeled amendment documents, each labeled original document in the training set comprising a plurality of training content sections at least one of which is labeled to indicate presence of an amendment, and each labeled amendment document in the training set comprising one or more training amendments at least one of which is labeled to indicate a corresponding content section of the corresponding labeled original document and further labeled to indicate a type of the training amendment;
generating, by the online document system, an amended original document comprising the plurality of content sections modified to include each amendment corresponding to each content section identified by the machine-learned model based on the type of amendment identified by the machine-learned model; and displaying, by the online document system within a document interface, the amended original document by displaying each of the plurality of content sections and, in conjunction with each content section, any amendments corresponding to the content section highlighted within the document interface.

2. The method of claim 1, wherein the labeled original document and the corresponding labeled amendment documents are augmented to identify a first ordered set of characters corresponding to the at least one labeled training content section and a second ordered set of characters corresponding to the type of training amendment.

3. The method of claim 1, further comprising:
receiving, by the online document system via the document interface, user feedback including at least one of: an approval of labeled content indicated by the system in the amended original document, an update to one or more content sections of the plurality of content sections, and a disapproval of a label indicated by the system to the amended original document.

4. The method of claim 3, further comprising:
based on the feedback, re-training, by the online document system, the machine-learned model by:
updating the training set to include a user-updated label of the amended original document and the set of amendment documents, the user-updated label of the amended original document comprising any updates to the one or more content sections of the plurality of content sections; and
re-training the machine-learned model using the labels of the updated training set.

5. The method of claim 1, wherein a content section is associated with a right or obligation of an entity associated with the original document, and wherein displaying amendments corresponding to the content section comprises highlighting changes made to the right or obligation by the amendments over time.

6. The method of claim 1, wherein the type of amendment includes an addition amendment, a substitution amendment, or a deletion amendment, and wherein displaying the amended original document comprises displaying, within the document interface, adjacent to any amendment, information about the amendment, the information including at least one of: an identifier corresponding to which amendment document of the set of amendment documents includes the amendment, the type of amendment, and a timing identifier corresponding to the amendment document of the set of amendment documents that includes the amendment.

7. A non-transitory computer-readable storage medium storing executable instructions that, when executed by a hardware processor, cause the processor to perform operations, the instructions comprising instructions to:
access an original document comprising a plurality of content sections;
access a set of amendment documents each comprising one or more amendments to the original document;
apply a machine-learned model to the original document and the set of amendment documents, the machine-learned model configured to identify, for each amendment document of the set of amendment documents, a content section of the plurality of content sections corresponding to each amendment of the one or more amendments and a type of amendment corresponding to each amendment of the one or more amendments, wherein the machine-learned model is trained using a training set of labeled documents that include labeled original documents and corresponding labeled amendment documents, each labeled original document in the training set comprising a plurality of training content sections at least one of which is labeled to indicate presence of an amendment, and each labeled amendment document in the training set comprising one or more training amendments at least one of which is labeled to indicate a corresponding content section of the corresponding labeled original document and further labeled to indicate a type of the training amendment;

generate an amended original document comprising the plurality of content sections modified to include each amendment corresponding to each content section identified by the machine-learned model based on the type of amendment identified by the machine-learned model; and display, within a document interface, the amended original document by displaying each of the plurality of content sections and, in conjunction with each content section, any amendments corresponding to the content section highlighted within the document interface.

8. The non-transitory computer-readable storage medium of claim 7, wherein the labeled original document and the corresponding labeled amendment documents are augmented to identify a first ordered set of characters corresponding to the at least one labeled training content section and a second ordered set of characters corresponding to the type of training amendment.

9. The non-transitory computer-readable storage medium of claim 7, the instructions further comprising instructions to:
receive, via the document interface, user feedback including at least one of: an approval of labeled content indicated in the amended original document, an update to one or more content sections of the plurality of content sections, and a disapproval of a label to the amended original document.

10. The non-transitory computer-readable storage medium of claim 9, the instructions further comprising instructions to:
based on the feedback, re-train the machine-learned model by:
updating the training set to include a user-updated label of the amended original document and the set of amendment documents, the user-updated label of the amended original document comprising any updates to the one or more content sections of the plurality of content sections; and
re-training the machine-learned model using the updated training set.

11. The non-transitory computer-readable storage medium of claim 7, wherein a content section is associated with a right or obligation of an entity associated with the original document, and wherein displaying amendments corresponding to the content section comprises highlighting changes made to the right or obligation by the amendments over time.

12. The non-transitory computer-readable storage medium of claim 7, wherein the type of amendment includes an addition amendment, a substitution amendment, or a deletion amendment, and wherein the instructions to display the amended original document further comprise instructions to display, within the document interface, adjacent to any amendment, information about the amendment, the information including at least one of: an identifier corresponding to which amendment document of the set of amendment documents includes the amendment, the type of amendment, and a timing identifier corresponding to the amendment document of the set of amendment documents that includes the amendment.

13. An online document system comprising a hardware processor and a non-transitory computer-readable storage medium storing instructions that, when executed by the hardware processor, cause the online document system to perform operations comprising:

accessing an original document comprising a plurality of content sections;

accessing a set of amendment documents each comprising one or more amendments to the original document;

applying a machine-learned model to the original document and the set of amendment documents, the machine-learned model configured to identify, for each amendment document of the set of amendment documents, a content section of the plurality of content sections corresponding to each amendment of the one or more amendments and a type of amendment corresponding to each amendment of the one or more amendments, wherein the machine-learned model is trained using a training set of labeled documents that include labeled original documents and corresponding labeled amendment documents, each labeled original document in the training set comprising a plurality of training content sections at least one of which is labeled to indicate presence of an amendment, and each labeled amendment document in the training set comprising one or more training amendments at least one of which is labeled to indicate a corresponding content section of the corresponding labeled original document and further labeled to indicate a type of the training amendment;

generating an amended original document comprising the plurality of content sections modified to include each amendment corresponding to each content section identified by the machine-learned model based on the type of amendment identified by the machine-learned model; and displaying, within a document interface, the amended original document by displaying each of the plurality of content sections and, in conjunction with each content section, any amendments corresponding to the content section highlighted within the document interface.

14. The online document system of claim 13, wherein the non-transitory computer-readable storage medium further stores instructions that, when executed by the hardware processor, cause the online document system to perform operations comprising:

receiving, via the document interface, user feedback including at least one of: an approval of labeled content indicated by the system in the amended original document, an update to one or more content sections of the plurality of content sections, and a disapproval of a label indicated by the system to the amended original document.

15. The online document system of claim 14, wherein the non-transitory computer-readable storage medium further stores instructions that, when executed by the hardware processor, cause the online document system to perform operations comprising:

based on the feedback, re-train, the machine-learned model by:

updating the training set to include a user-updated label of the amended original document and the set of amendment documents, the user-updated label of the amended original document comprising any updates to the one or more content sections of the plurality of content sections; and re-training the machine-learned model using the updated training set.

16. The online document system of claim 13, wherein the instructions to display the amended original document further cause the online document system to perform operations comprising displaying, within the document interface, adjacent to any amendment, information about the amendment, the information including at least one of: an identifier corresponding to which amendment document of the set of amendment documents includes the amendment, the type of amendment, and a timing identifier corresponding to the amendment document of the set of amendment documents that includes the amendment.

\* \* \* \* \*